April 28, 1925.

C. W. STEELE ET AL

METHOD OF MAKING HOLLOW RUBBER ARTICLES

Filed June 19, 1922  2 Sheets-Sheet 1

1,535,354

Inventor
Charles W. Steele and
Richard T. Griffiths,
by Spear Middleton Donaldson & Hall
Attys.

April 28, 1925.

C. W. STEELE ET AL 1,535,354

METHOD OF MAKING HOLLOW RUBBER ARTICLES

Filed June 19, 1922    2 Sheets-Sheet 2

Inventor
Charles W. Steele and
Richard T. Griffiths,
by Spear Middleton Donaldson & Hall
Attys.

Patented Apr. 28, 1925.

1,535,354

UNITED STATES PATENT OFFICE.

CHARLES W. STEELE AND RICHARD T. GRIFFITHS, OF AKRON, OHIO, ASSIGNORS TO THE MILLER RUBBER COMPANY, OF AKRON, OHIO, A CORPORATION OF OHIO.

METHOD OF MAKING HOLLOW RUBBER ARTICLES.

Application filed June 19, 1922. Serial No. 569,492.

*To all whom it may concern:*

Be it known that we, CHARLES W. STEELE and RICHARD T. GRIFFITHS, citizens of the United States, and residents of Akron, in the county of Summit and State of Ohio, have invented certain new and useful Improvements in Methods of Making Hollow Rubber Articles, of which the following is a specification.

Our present invention relates to improvements in the method of manufacturing hollow plastic articles, such, for example, as rubber playing balls, and aims to facilitate the manufacture of the articles and to secure more uniformity in the product and a better grade, and to reduce to a minimum wastes or losses due to bursting or rupturing of seams during vulcanization, and other defects heretofore encountered. The process herein described may be conveniently carried out by aid of the apparatus which forms the subject of a companion application filed of even date herewith, Serial No. 569,493.

The invention includes the novel method and novel steps thereof hereinafter described, the nature and scope of our invention being defined by the appended claims.

In order that the invention may be better understood, we have appended hereto explanatory drawings of apparatus which may be employed in carrying out our invention, which, as it may be changed in many ways and is simply illustrative of our desired apparatus, is shown largely in a conventional manner.

Referring by reference characters to these drawings:—

Figure 1:
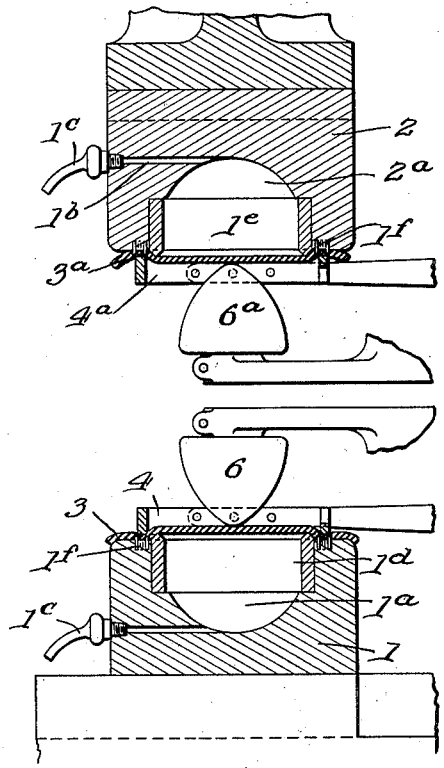
Fig. 1 is a conventional sectional view of a pair of shaping dies having associated therewith clamping means in the shape of annular rings, and also having associated therewith formers or shapers for cupping the blanks, the parts being shown in the position assumed before the blanks are acted upon by the shapers, but with the blanks in position.
Figure 2:
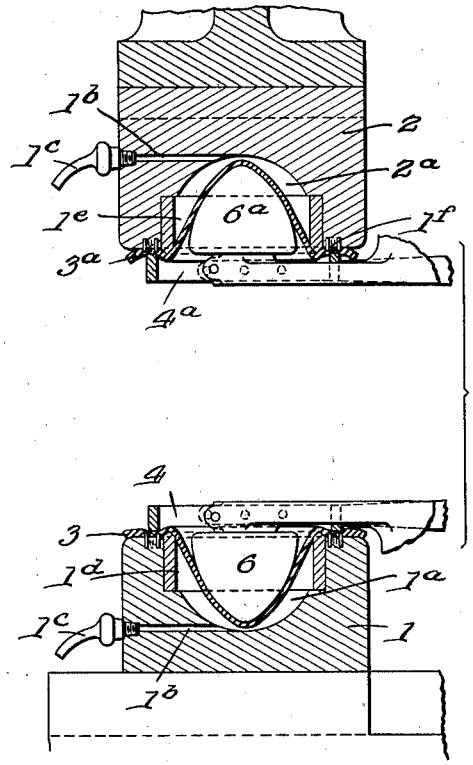
Fig. 2 is a similar view showing the shapers or formers moved into position to shape or cup the sheets or blanks.
Figure 3:
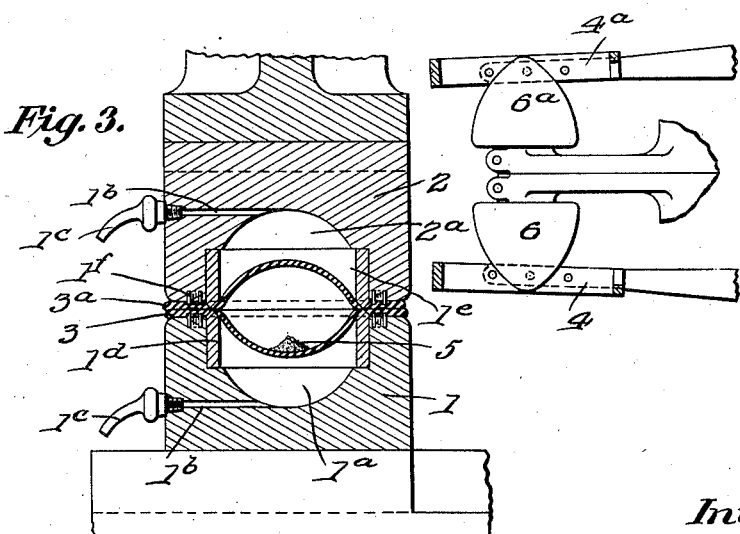
Fig. 3 is a similar view showing the clamping rings and formers removed and the dies brought together to sever or trim the cupped or shaped blanks and join the trimmed or cut edges.

In proceeding according to our invention we place across the mouth of a lower die 1 having a die cavity 1ª a sheet of plastic material such as rubber which may be of any size, but which, for convenience of manipulation, may be only slightly larger than the die opening, and opposite the die cavity 2ª of the upper die 2 we position a similar sheet or blank, these sheets or blanks being designated 3 and 3ª respectively, and the upper sheet being supported by a ring 4ª which may be supported in any suitable manner and is adapted to be thereafter moved toward the upper die to clamp the blank 3ª about the die cavity 2ª.

A lower clamping ring 4 is designed to be placed over the lower blank 3 to clamp this to the lower die in a similar manner. After the sheets or blanks have been so clamped, we force the portions of the sheets lying across the die cavities into the cavities to reversely shape or cup the blanks, these being forced thereinto in any desired manner, conveniently by suitably shaped reversely positioned formers 6 and 6ª.

The die cavities are vented by vent passages 1ᵇ which are provided with suitable check valves 1ᶜ which allow the air to escape from the die cavities but prevent its return, whereby the articles are held in cupped or shaped condition by atmospheric pressure after the formers have been removed.

In forcing the blanks into the die cavities we use formers of such shape and dimensions or move them to such amounts that the sheets are not forced into contact with the walls of the cavities, the shaping being performed entirely by the formers.

With formers of this shape and acting in the manner described herein each portion of the sheet as it contacts with the former is precluded from thereafter stretching, and stretching is confined to the portion of the sheet between the former and the annular edge of the die, or in other words, there is a progressive action from the center to the edge until the article is completely shaped.

The dies which we prefer to use are provided with blunt cutting rings or flanges 1$^d$ and 1$^e$ which, as the dies come together, simultaneously sever the article forming portions from the sheets, or trim the edges if small sheets are used, and unite such cut or trimmed edges by a pressing action in the manner well understood by those skilled in the art.

Before the dies can be brought together it is necessary, of course, to remove the rings and formers. These elements might be manipulated by hand if desired, but we find it more convenient to support and operate them in the manner disclosed in an application filed of even date herewith, Serial No. 569,493.

Preferably the formers are of such shape and size relative to the article sections and are so manipulated that the two sections when united do not take the shape of the finished article, but shape the sections in such a manner that any diameter taken through the seam or line of juncture will approximate the interior diameter of the corresponding portion of the curing mold, while the diameter perpendicular to the seam will be much less than said seam diameter.

It will be understood that before the two halves or sections forming the article are brought together a suitable substance (well known in the art) which will gasify under vulcanizing heat, is placed in between the sections as indicated at 5.

After the sections have been joined together and placed in the mold and curing heat applied, the expansion due to the gas formation causes the article to expand within the mold. Due to the shape of the article above described the seam lies in close proximity to the wall of the mold and hence is subjected to little or no expansion and hence danger of bursting at the seam is removed; while the remaining portions which are subjected to greatest expansion being seamless are not likely to burst or rupture, under such expansion.

In the manufacture of balls the article before vulcanization would take the form of an oblate spheroid with its equatorial or seam diameter much longer than its polar diameter.

Figure 4:
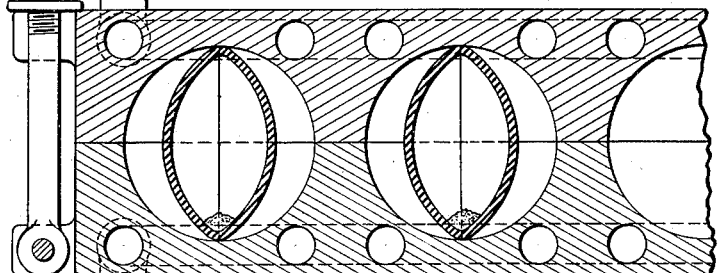
Fig. 4 is a sectional view of the curing mold with the article in place therein prior to the application of the curing heat.

It may be noted at this point that in the expansion of an article of the shape described, the equatorial portion of the seam being in contact with the wall as shown in Fig. 4, there is thereafter a progressive contact until the polar regions are reached, which are the last to contact.

Figure 5:
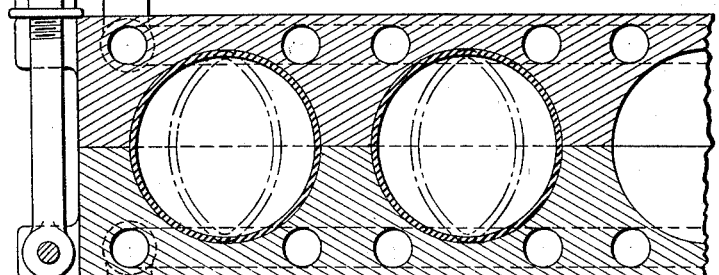
Fig. 5 is a similar view showing in full lines, the position of the article after curing.

As a further safeguard against rupturing of the seam, we so place the article in the mold that the seam is out of alignment with the parting line of the mold, preferably placing the seam perpendicularly to the parting line, as indicated in Figs. 4 and 5.

To avoid any possibility of air working under the edge of the blank and thus releasing the partial vacuum after the clamping rings have been removed, we provide the die members with annular rows of slightly headed pins 1$^f$ which penetrate the marginal portions of the stock and thus mechanically fasten the sheets to the die faces about the die or mold cavities, the word mechanically being used to distinguish from holding by suction.

Another result which flows from the manner of shaping and curing the article with the seam perpendicular to the parting line of the mold is that free escape of air from the mold is permitted, all air being expelled through the mold joint before the article finally contacts with said joint portion.

Having thus described our invention, what we claim is:—

1. The herein described steps in the method of forming hollow plastic articles which consists in holding a blank about the edge of a die cavity, and forcing the blank into the cavity to cup the same without contact with the wall of the cavity.

2. The herein described method of forming hollow plastic articles which consists in holding a pair of blanks about the edges of opposed die cavities, forcing said blanks into said cavities to cup the same without contact with the walls of the cavities while venting the cavities, and subsequently dieing together the edges of the blanks while holding them cupped by atmospheric pressure.

3. The herein described steps in the method of forming hollow plastic articles which consists in holding a blank about the edges of a die cavity and mechanically forcing said blank into said cavity to cup the same without contact with the walls of the cavity while venting the cavity and preventing return of air to the cavity.

4. The herein described step in the manufacture of plastic article sections which consists in clamping a blank about a die cavity, and applying pressure by a former which contacts progressively with the portion of the blank over said cavity from the center towards the edges and shapes the same without contact with the die cavity.

5. The herein described step in the method of making a hollow plastic article, which consists in pinning a blank of rubber about the edge of a die cavity and thereafter applying pressure in line with the cavity to cup the blank.

6. The herein described step in the manufacture of plastic article sections which consists in clamping a blank about a die cavity, and applying pressure by a former which contacts progressively with the portion of the blank over said cavity from the center towards the edges, the blank being maintained out of contact with the wall of the cavity.

7. The herein described method of forming hollow plastic articles which consists in holding a pair of blanks about the edges of opposed die cavities, forcing said blanks into said cavities to cup the same without contact with the walls of the cavities, simultaneously venting the cavities and preventing the return of escaping air, the cupping being carried beyond the required degree, whereby the inherent elasticity of the material causes a partial retraction, subsequently dieing together such partially retracted blanks with an interposed gasifying medium, and finally vulcanizing the article in a closed mold.

In testimony whereof, we affix our signatures.

CHARLES W. STEELE.
RICHARD T. GRIFFITHS.